2,752,549

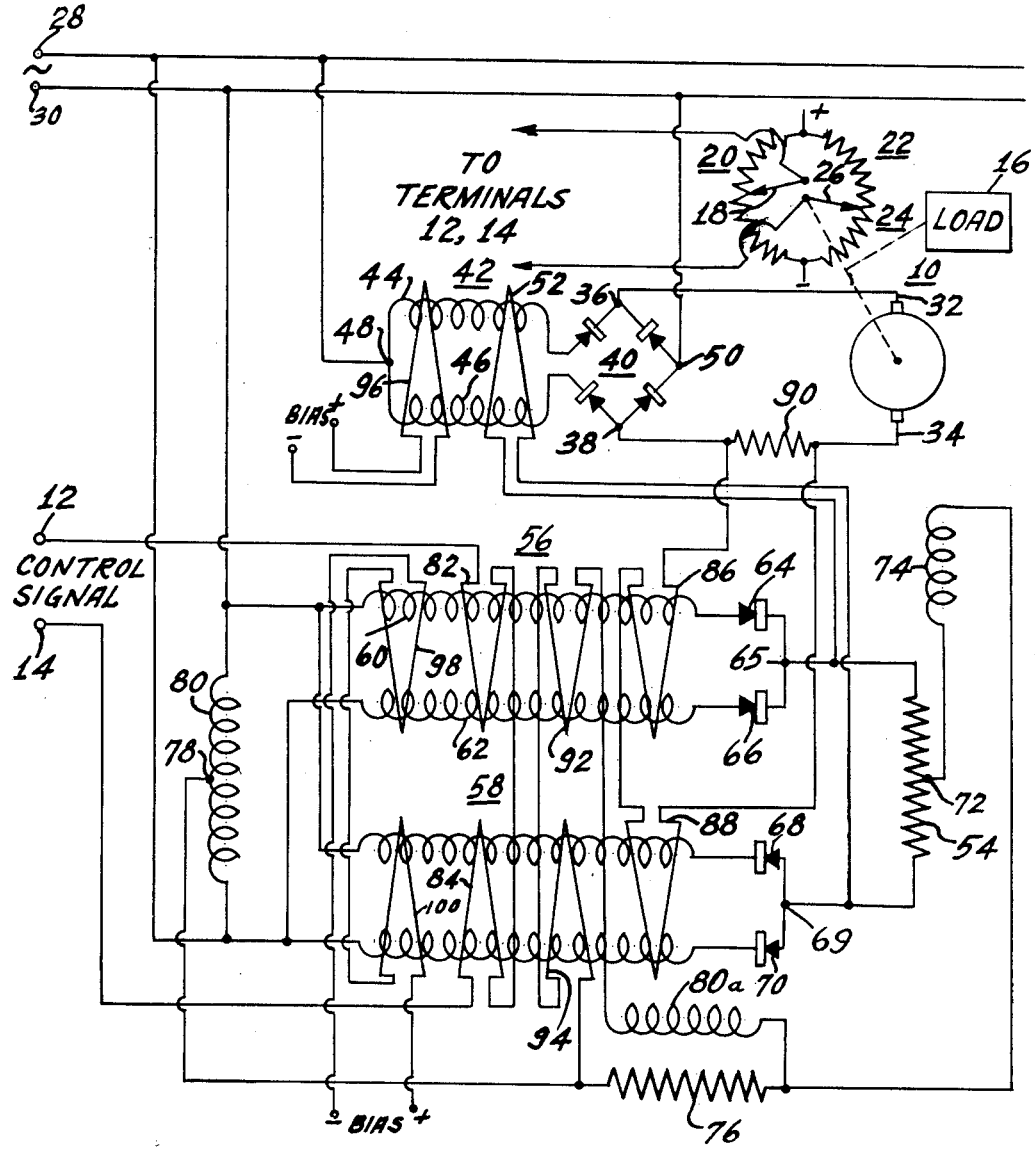
Fig_1

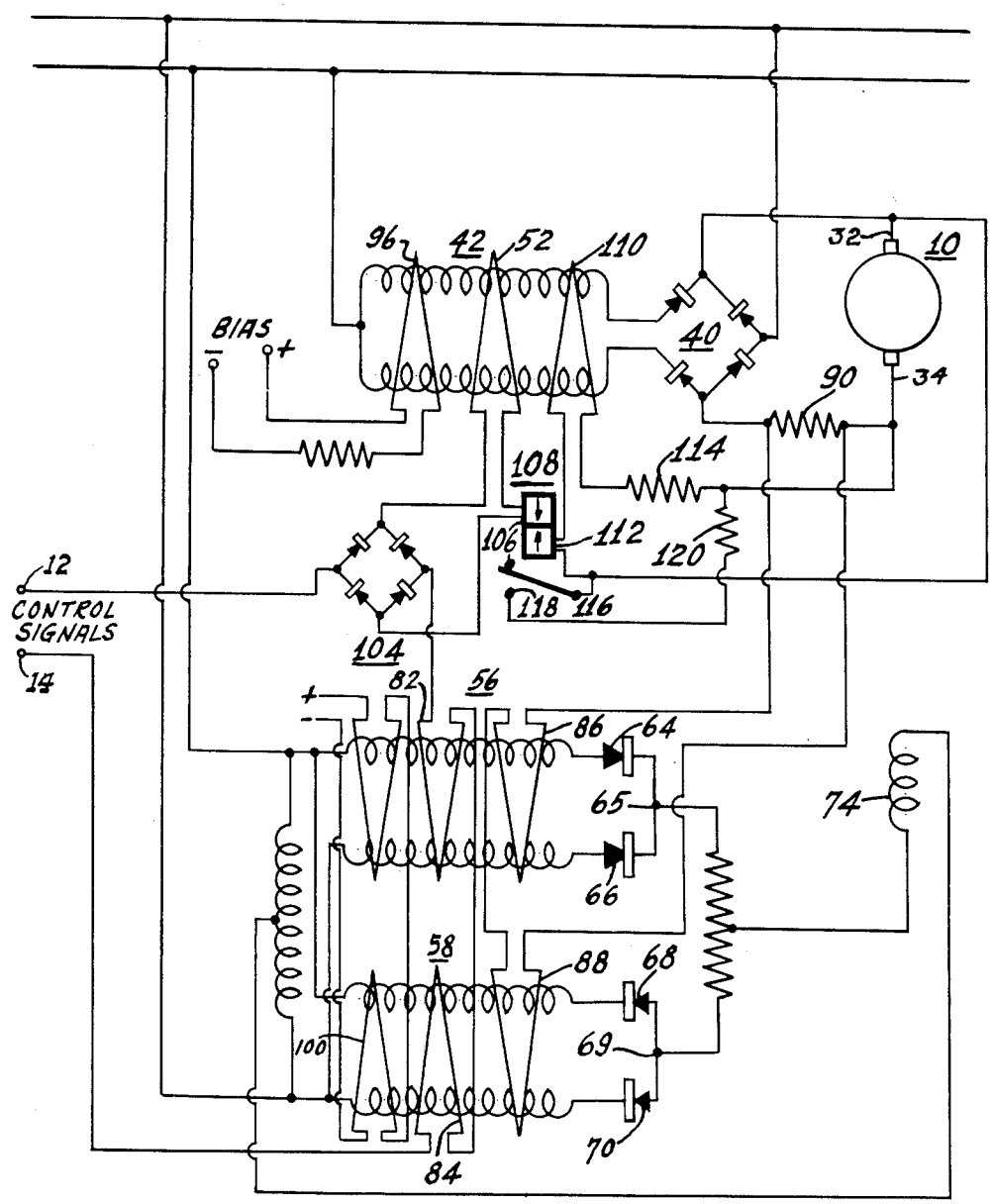
Fig_2
INVENTOR.
Ernst F. W. Alexanderson
BY Milton S. Winters
ATTORNEY United States Patent Office 2,752,549
Patented June 26, 1956

MAGNETIC AMPLIFIER MOTOR CONTROL

Ernst F. W. Alexanderson, Schenectady, N. Y.

Application July 27, 1953, Serial No. 370,268

30 Claims. (Cl. 318—296)

The present invention relates to magnetic amplifiers, and particularly to magnetic amplifiers as employed for motor control.

Magnetic amplifiers are employed for the control of motors, as in servo mechanisms and motor speed control circuits. As well understood in the art, it is desirable in motor control circuits to employ a velocity feedback signal. In prior circuits, the use of such a feedback signal in the load circuit of the magnetic amplifier has required the duplication of the magnetic amplifier, with resistances interposed to prevent a short-circuit. The resistances, however, lower the efficiency of the circuit. When such control circuits employing resistances are used at a low power level, the objection to their use is not serious. However, when a high power magnetic amplifier is to be employed, both the duplication of the amplifier at the high power level and the power inefficiency are objectionable.

It is an object of the present invention to provide a novel circuit which avoids duplication of the magnetic amplifier circuit at high power levels.

Another object of the invention is to provide a magnetic amplifier circuit for high power level use which is also highly efficient.

A further object of the invention is to provide a novel system of velocity feedback control, whereby fast and accurate motor and braking operation is possible without instability or hunting, particularly in servo and speed amplifiers of the magnetic type.

Still another object of the invention is to provide a magnetic amplifier circuit for an adjustable speed reversible motor which permits application of a braking torque to prevent overdrive of the motor or which enables absorption of the energy of inertia with a quick reduction of speed when the motor is to be slowed or stopped.

In accordance with the invention, duplication of the magnetic amplifiers with the use of resistances is employed only in a stage of amplification at a lower power level, but is avoided at the full power level. The motor field coils are included in the first low power stage, and the motor armature is included in the high power stage. The low power stage with duplicate amplifiers and resistances affords reversal of the current flow in the field winding, while the armature fed by the high power amplifier carries unidirectional current. A velocity feedback is secured by an additional pair of low power amplifier windings connected in series with each other across an impedance in series with the motor armature.

The foregoing and other objects, advantages and novel features of the invention will be more fully apparent from the following description when taken in connection with the accompanying drawing, in which like reference numerals refer to similar parts, and in which:

Fig. 1 is a schematic diagram of one embodiment of the invention as applied to a position servo mechanism; and Fig. 2 is a schematic diagram of another embodiment of the invention especially suitable for a speed control system.

Referring to Fig. 1, a reversible D. C. (direct current) motor 10 is to be positioned in accordance with an error signal or other position signal applied to a pair of terminals 12, 14. For example, the motor 10 may drive a load 16 which is to be brought into positional correspondence with a control element, such as the arm 18 of a potentiometer 20. The error signal proportional to the difference in positional correspondence between the control element or arm 18 may be derived by the arrangement 22 in which a second potentiometer 24 has an arm 26 mechanically coupled to the load 16 and the motor 10. The two potentiometers are arranged in a bridge across which a voltage is applied. The D. C. voltage between the two arms 18, 26 is proportional to the lack of positional correspondence between the load 16 and the control element 18. There are other known means of deriving such an error voltage. The motor 10 is to be driven by power taken from an A. C. (alternating current) source connected across the terminals 28, 30. The D. C. motor armature terminals 32 and 34 are connected at the conjugate terminals 36, 38 respectively of a bridge circuit 40. The bridge circuit 40 includes a pair of output windings 44, 46 of a magnetic amplifier 42, indicated in conventional schematic form. The windings 44 and 46 have a common terminal 48 which serves as one of the second conjugate terminals of the bridge 40, and is connected to the A. C. power terminal 28. The remaining conjugate terminal 50 of the bridge 40 is connected to the other A. C. power terminal 30. Separate rectifying elements are connected in series in each arm of the bridge circuit 40, in the polarity shown so that full wave rectification of current from the A. C. power source in response to control currents in the control windings of the high power magnetic amplifier 42 pass through the armature of the motor 10.

The magnetic drive-amplifier 42 has a control winding 52 which is connected across a resistor 54 connected between the output terminals 65, 69 of a pair of low power magnetic amplifiers 56 and 58. The first low power amplifier 56 has a pair of output windings 60 and 62 each of which is connected to a different one of the A. C. power terminals 28 and 30. Each of the first low power amplifier output windings 60 and 62 are connected respectively to a different one of rectifying elements 64 and 66, the anodes of which have a common junction terminal at 65, the output, with one terminal of the resistor 54. The other low power amplifier 58 is similar to the first low power amplifier 56 in this respect except that its rectifying elements 68 and 70 have their cathodes connected in common to the output terminal 69 and to the other terminal of resistor 54. The resistor 54, which prevents a short-circuit of the idle low power amplifier, has a center tap 72 connected to one terminal of the field winding 74 of motor 10. The other terminal of field winding 74 is connected through a resistor 76 to the center tap 78 of an inductor 80 connected between the A. C. power terminals 28 and 30. The resistor 76 is part of a reactive phase-shifting network comprising the resistor 76 and the inductor 80a, the purpose of which will be more fully described hereinafter. The first low power magnetic amplifier 56 has a first control winding 82 connected in series with a like first control winding 84 of the second low power magnetic amplifier 58 between the error signal terminals 12, 14. Second control windings 86 and 88 of the low power magnetic amplifiers 56 and 58, respectively, are connected in series between the terminals of a resistor 90 inserted in series with the armature of motor 10 and the bridge rectifier 40 conjugate terminals 36, 38. Third control windings 92 and 94 respectively of low power magnetic amplifiers 56 and 58 are connected in series with the inductor 80 across the terminals of resistor 76 of the phase shifting network 76, 80.

The high power magnetic amplifier 42 has a bias winding 96 connected to a suitable D. C. source preferably of adjustable voltage, for a purpose which will appear hereinafter. The two low power magnetic amplifiers 56, 58 each may have a bias winding 98 and 100 respectively connected in series to an adjustable source of D. C. voltage, to provide a desired sensing.

In operation, a D. C. voltage appears across the terminals 12, 14 proportional to the lack of positional correspondence (if any) between the load 16 and the control element 18. Such a voltage is derived by the network 22 when the control arm 18 is displaced from a position of correspondence with the control arm 26. Other means are well known for deriving an error voltage of this kind. If desired, the control element 18 may be manually positionable as desired. The low power amplifier control windings 82, 84 are so connected and wound with respect to the preferential self-saturation magnetic fields of the cores due to the low power amplifier rectifiers, that one low powered amplifier 56, 58 responds to an error voltage and consequently a current through the control windings 82, 84 in one sense, and the other low power amplifier responds to a signal of the other sense. Most modern magnetic amplifiers have such sensing. However, such sensing may always be secured by providing suitable bias windings 98, 100 for the low power amplifiers 56, 58, appropriately wound and connected.

The resistance 54 is connected one half in series with the motor field load 74 and the output circuits of one of the two low power amplifiers 56, 58 and the other half in series with the load and the output circuit of the other low power amplifier. The output windings of each of the low power amplifiers, although in parallel with each other, are in series with the field winding 74 of the motor 10. Therefore, and because of the way rectifiers 64, 66 and 68, 70 are poled, one amplifier can apply a current in one sense only through the field winding 74 and the other amplifier a current in the other sense through the field winding 74. The resistance 54 prevents the idle low power amplifier from short-circuiting the voltage of the active low power amplifier. As long as both amplifier outputs are equal, the motor reversals are so fast that, due to the inertia of the motor, or of the motor and the load, the motor 10 does not drive. However, when this balance is upset by the error voltage, the current through one of the low power amplifiers 56, 58 increases, and that through the other decreases. Therefore, the motor drives, and the connections are made so that the load 16 is driven toward positional correspondence with the control element 18.

If the error signal suddenly changes, in a direction to reverse the direction of motor drive, the back E. M. F. (electromotive force) of the motor may be greater than the forward or applied E. M. F. The applied E. M. F. is controlled by the control winding 52, which is connected across the resistor 54. It will be noted that the current through the control winding 52 of the high power amplifier 42, at least in ordinary operation, does not reverse. This lack of reversal is due to the fact that the current flow (electron flow) in the example illustrated is always from the upper terminal of the resistor 54 (as viewed in the drawings) to the lower terminal, and consequently the lower terminal is always positive with respect to the upper terminal of the resistor 54. Therefore, the direction of drive of the motor is always controlled by the sense of current flow in the field winding 74, whereas the armature current is always in the same direction. However, in operation wherein the error signal is suddenly reduced in amplitude or reversed, as mentioned above, the motor may generate a back E. M. F., which may be too great in amplitude if the signal is strong, such as a sudden reversal of signal. Such operation may cause the bridge rectifier circuit 40 substantially to short-circuit the armature of the motor 10. The resulting braking torque may be too strong. Moreover, control of the motor through the high power amplifier control winding 52 is lost, because of the effectively short-circuited armature. In order to avoid this difficulty and loss of control, a feedback is provided from the current in the motor armature of motor 10 to the second control windings 86, 88 of the low power amplifiers 56, 58.

The current supplied to the motor armature by the high powered magnetic amplifier is always in one direction, whereas the control signal applied to terminals 12, 14 is reversible. When the control signal suddenly reverses its polarity or changes its amplitude, the current through the field winding suddenly changes in magnitude or reverses its polarity. Assume that the control signal suddenly changes its polarity. This causes the current through the field winding suddenly to reverse but it takes a given amount of time for the direction of the armature to reverse. During this period, that is, during the period that the field has reversed but the direction of rotation of the armature has not yet reversed, the motor acts as a generator and develops across its terminals 32, 34 an E. M. F. which is the reverse of the voltage applied to it by rectifier 40. The rectifier acts as a short circuit to the reverse E. M. F. and the entire reverse E. M. F. is applied across resistor 90. Study of the circuit will show that the current in the armature circuit is in the same direction regardless of whether the motor armature is acting as a load or a generator. However, when the motor acts as a generator and overpowers the rectifier, the amplitude of the voltage developed across resistor 90 is substantially increased. Thus, when the control signal suddenly changes amplitude or reverses polarity the amount of feedback current (but not the direction of current flow in the feedback circuit) substantially increases.

The feedback windings 86, 88 of the low power magnetic amplifiers are wound to oppose the currents in the primary control windings 82, 84. The feedback opposes the signal in the amplifier which carries the stronger current, and adds to the signal in the other low power amplifier. Thus the feedback has the effect of reducing the braking current to a suitable degree in relation to the error signal current. Ordinarily, with such signal reversal as that mentioned, one of the low powered amplifiers is deactivated entirely, while the output from the other one is decreased by the signal taken from across the resistor 90. In any event, the feedback signal derived across the resistor 90 provides the desired braking for a sudden signal reversal.

The bias provided for the winding 96 of the high power amplifier 42 allows a "stand-by" current, which may be as much as one half the full load current, to flow through the motor 10 armature when the signal is zero and the motor is at a standstill. Thus the motor 10 is ready to respond to a weak signal in either direction.

It will be apparent that the system just described may be a servo mechanism or any other system which requires motor operation with feedback control. A delayed negative feedback from the motor field current, in addition to the feedback from the motor 10 armature is provided. This second feedback is provided by the voltage from across resistor 76 through the reactive network of resistor 76, and inductor 80a. The current through the third control windings 92, 94 of low power amplifiers 56, 58 is also arranged to oppose the control signal in both low power amplifiers. It provides what is termed an "anticipatory" voltage by the phase shifting action of the network 76, 80.

If desired, the system illustrated by Fig. 1 and described as a position control system may be used as a variable speed control. In that event, the error signal must respond to the difference between the desired speed and the actual speed as measured, for example, by a tachometer generator (not illustrated).

Fig. 2 illustrates a system better suited for speed control. In the arrangement of Fig. 2, the high power amplifier 42 control winding 52 is connected in series with a bridge rectifier 104 and the winding 106 of a differential relay 108. The high power amplifier 42 is provided with a second control winding 110 connected in series with a second winding 112 of the differential relay 108, and with a resistor 114, across the motor 10 armature terminals. A movable contact 116 of the differential relay 108 may be connected to one of the motor 10 armature terminals, and a fixed contact 118 of differential relay 108 is connected through a resistor 120 to the other motor 10 armature terminal. The contact connections (movable contact 116 and fixed contact 118) are normally open and are made when the winding 112 current exceeds the current in winding 106. In the low power amplifiers only the first and second control windings 82, 84 and 86, 88 respectively, and the bias windings, may be provided. In operation, the control signal represents the desired speed and is impressed directly on the control windings 82, 84 of the low power amplifiers and the control winding 52 of the high power amplifier. In the high power amplifier, the control signal is opposed by a negative feedback through the second control winding 110. The windings should be such that the negative feedback through the second control winding 110 has considerable effect. This negative feedback signal through winding 110 in effect opposes the control signal of winding 52. The effect of the feedback from the motor 10 armature in opposition to the signal current is to maintain, for a given control signal, a substantially constant voltage impressed on the armature terminals proportional to the control signal. The voltage impressed at the armature terminals varies, not with load, but with speed, in a sense to make the speed conform to the control signal, and to tend to keep the armature voltage constant for a given control signal. The control signal is reversed in sense to reverse rotation of the motor, whereas the power amplifier should always deliver current in the same direction. Furthermore, a constant field strength, that is, a constant current through the field winding 74 is desired in order to make the motor speed substantially proportional to the armature voltage. Therefore, the full wave bridge rectifier 104 is employed so that the signal current through the high power amplifier control winding 52 is unidirectional, regardless of the sense of current flow through the low power control windings 82, 84. Furthermore, the low power amplifiers 56, 58 are so constructed that they are sensitive to low signal currents to produce substantially maximum output current, so that even for very low signals, the current through the field winding 74 is the same as for high signals. Furthermore, in order to insure suitable regulation at the lowest speed of the motor, the high power amplifier 42 biased through winding 96 assures that the high power amplifier does not become active until the signal strength has reached about 10% of maximum. Such signal, however, is sufficient to saturate the field amplifiers and provide maximum current through the field winding 74. The speed regulating effect, therefore, even at very low speed starts with full field strength.

This type of speed control is suitable for a tool machine with a low speed cutting stroke and a high speed return stroke. When the signals are reversed at the end of a stroke, a braking torque is developed which makes possible a quick reversal of rotation. This braking torque is controlled by the feedback taken from across resistor 90, as explained in connection with Fig. 1. However, if this system of control (Fig. 2) is intended for use with an overhauling load, such as a descending elevator, a different system of braking is desirable, because the signal does not reverse when the motor goes over speed. Accordingly, the normally disconnected resistor 120 is shunted across the motor armature when required to provide the braking. The resistor 120 is normally disconnected to avoid unnecessary power waste. To provide automatic means of connection of the resistor 120 when required, a differential relay 108 is employed. The relay 108 is actuated upon the current through the high power amplifier second control winding 110 exceeding the current through the high power amplifier first control winding 52. In other words, when the feedback voltage developed across the motor 10 armature in the appropriate sense exceeds the voltage which corresponds to the control current in winding 52, the differential relay 108 is actuated and the shunt connection of resistor 120 across the armature of motor 10 is made.

The invention thus described affords a means of securing appropriate feedback, especially suited for magnetic amplifiers. Correction may be obtained in the case of a motor position amplifier through feedback from the motor armature winding to control windings of the low power amplifiers, which supply the field winding current. In the case of a speed servo a further correction may be obtained by using a shunt resistor to self-brake the motor under the proper over-speed conditions.

What is claimed is:

1. A reversible control system for a direct current motor having an armature and a field winding and comprising a high power magnetic amplifier of the direct current output type connected to deliver current of one sense only to the motor armature; a pair of low power magnetic amplifiers, one connected to deliver current in one sense and the other in the opposite sense to the motor field winding; a pair of terminals to receive a direct current control voltage; each of said low power amplifiers having a control winding, the control windings being connected to said terminals in such sense that a signal current in one sense causes field current in one sense to exceed that of the other, and vice-versa; said high power amplifier having a control winding connected across the output terminals of the said pair of low power amplifiers, and said low power amplifiers having a further control circuit connected to be energized from the current in the circuit of said motor armature to apply a negative feedback signal to said pair of low power amplifiers.

2. A reversible motor control system for a direct current motor having an armature and a field winding and comprising a pair of low power magnetic amplifiers connected to deliver reversible currents to said field winding, each said amplifier having a first and a second control winding; a high power magnetic amplifier connected to apply its output current to said armature and having a first control winding electrically coupled to said low power amplifier; an impedance connected in series circuit with said armature and said high power amplifier to have developed across it a voltage responsive to the current in said series circuit, the said second control windings of said pair of low power amplifiers being connected in series with each other across said impedance; the said first control windings of said low power amplifiers being connected in series for connection to a source of control voltage.

3. The system claimed in claim 2, said high power amplifier first control winding being connected in series with said low power amplifier first control windings; a full wave rectifier also connected in series with said high power first control winding; a high power amplifier second control winding; a second impedance; and a relay circuit including a differential relay, said relay having one winding connected in series between said high power amplifier first control winding and said rectifier, and having another winding connected in series with said high power amplifier second control winding and said armature, said relay being operable upon the current through the latter relay winding exceeding the current through the former relay winding to connect said second impedance in shunt across the armature of said motor.

4. The system claimed in claim 2, said system further comprising a resistor, and means responsive to the difference in current between the current in said two high power magnetic amplifier control windings to connect said resistor in shunt across said armature.

5. The system claimed in claim 2, said high power amplifier first control winding being connected across the outputs of said low power amplifiers.

6. The system claimed in claim 2, said impedance being a resistor.

7. The system claimed in claim 2, said low power amplifier second control windings being wound with respect to said low power amplifier first control windings normally to aid the core saturation magnetic fields from one or the other of said first windings depending on the sense of current flow through said first control windings, and said current responsive voltage being applied to said second control windings in such a sense that, on reversal of a control signal applied to said first control windings, the field from said second control windings opposes that from said first.

8. In a control system for a direct current motor having a field winding and armature, in combination, first magnetic amplifier means of the direct current output type connected to deliver current in one sense only to said armature; second and third magnetic amplifier means of the direct current output type, one connected intermittently to pass current through said field winding in one sense and the other connected intermittently to pass current through said field winding in the opposite sense, whereby, when the outputs of said second and third amplifier means are of equal amplitude, there is no rotation of said armature; connection means for a source of direct current control signal having a sense indicative of the direction of motor rotation desired; control circuit means coupled to said second and third amplifier means and responsive to said direct current control signal, for increasing the output of said third amplifier means and decreasing the output of said second amplifier means in response to a control signal of one sense, and decreasing the output of said third amplifier means and increasing the output of said second amplifier means in response to a control signal of opposite sense, whereby a control signal of one sense causes motor rotation in one direction and a control signal of opposite sense causes motor rotation in the opposite direction; and feedback circuit means responsive to a control signal which suddenly changes its amplitude or polarity, connected on the one hand to the circuit of said armature and on the other hand to the circuits of said second and third amplifier means, for preventing as sudden changes in the relative amplitudes of the outputs of said second and third amplifier means.

9. In a control system for a direct current motor having a field winding and armature, in combination, first magnetic amplifier means of the direct current output type connected to deliver current in one sense only to said armature; second and third magnetic amplifier means of the direct current output type, one connected intermittently to pass current through said field winding in one sense and the other connected intermittently to pass current through said field winding in the opposite sense, whereby, when the outputs of the said second and third amplifier means are of equal amplitude, there is no rotation of said armature; connection means for a source of direct current control signal having a sense indicative of the direction of motor rotation desired; control circuit means coupled to said second and third amplifier means and responsive to said direct current control signal, for increasing the output of said third amplifier means and decreasing the output of said second amplifier means in response to a control signal of one sense, and decreasing the output of said third amplifier means and increasing the output of said second amplifier means in response to a control signal of opposite sense, whereby a control signal of one sense causes motor rotation in one direction and a control signal of opposite sense causes motor rotation in the opposite direction, and sudden changes in the amplitude of said control signal produce sudden changes in the current in the circuit of said armature; and feedback circuit means connected on the one hand to said circuit of said armature and on the other hand to the circuit of said second and third amplifier means, and responsive to sudden changes in said current in said armature circuit for preventing as sudden corresponding changes in the outputs of said second and third amplifier means.

10. In a control system for a direct current motor having a field winding and armature, in combination, first magnetic amplifier means including rectifier means as the output stage thereof connected to deliver current in one sense only to said armature; second and third magnetic amplifier means of the direct current output type, one connected intermittently to pass current through said field winding in one sense and the other connected intermittently to pass current through said field winding in the opposite sense, whereby, when the output of said second and third amplifier means are of equal amplitude, there is no rotation of said armature; connection means for a source of direct current control signal having a sense indicative of the direction of motor rotation desired; control circuit means coupled to said second and third amplifier means, and responsive to said direct current control signal, for increasing the output of said third amplifier means and decreasing the output of said second amplifier means in response to a control signal of one sense, and decreasing the output of said third amplifier means and increasing the output of said second amplifier means in response to a control signal of opposite sense, whereby a control signal of one sense causes motor rotation in one direction and a control signal of the opposite sense causes motor rotation in the opposite direction, and sudden changes in the polarity or amplitude of said control signal cause said motor to act as a generator, said rectifier means to act as a short circuit to said generator, and the current in the circuit including said armature and rectifier means substantially to increase; and feedback circuit means connected on the one hand in the circuit of said armature and rectifier means and on the other hand to the circuits of said second and third amplifier means, and responsive to the current in said circuit of said armature and rectifier means for reducing the absolute amplitude of the one of the output signals of said second and third amplifier means of greater amplitude.

11. In a control system for a direct current motor having a field winding and armature, in combination, first magnetic amplifier means including rectifier means as the output stage thereof connected to deliver current in one sense only to said armature; second and third magnetic amplifier means of the direct current output type, one connected intermittently to pass current through said field winding in one sense and the other connected intermittently to pass current through said field winding in the opposite sense, whereby, when the outputs of said second and third amplifier means are of equal amplitude, there is no rotation of said armature; connection means for a source of direct current control signal having a sense indicative of the direction of motor rotation desired; first control circuit means coupled to said second and third amplifier means, and responsive to said direct current control signal, for increasing the output of said third amplifier means and decreasing the output of said second amplifier means in response to a control signal of one sense, and decreasing the output of said third amplifier means and increasing the output of said second amplifier means in response to a control signal of opposite sense, whereby a control signal of one sense causes motor rotation in one direction and a control signal of the opposite sense causes motor rotation in the opposite direction, and sudden changes in the polarity or amplitude of said control signal cause said motor to act as a generator, said rectifier means to act as a short circuit to said generator, and the current in the circuit including said armature and rectifier means substantially to increase; and feedback circuit means connected on the one hand in the circuit of said armature and rectifier means and on the other hand to the circuits of said second and third amplifier means, and responsive to the current in said first-named circuit for controlling the relative amplitudes of the outputs of said second and third amplifier means.

12. In a control system as set forth in claim 11, said feedback circuit means including an impedance element in series circuit with said armature and rectifier means.

13. In a control system as set forth in claim 12, said second and third amplifier means each including an output terminal, a second control winding on said second amplifier means, a second control winding on said third amplifier means connected in series with said second control winding on said second amplifier means, and a negative feedback circuit connected between said output terminals and said pair of second control windings, said feedback circuit including a time delay circuit for substantially delaying the signal fed back from said output terminals to said pair of second control windings.

14. In a control system as set forth in claim 11, said impedance element comprising a resistor.

15. In a control system as set forth in claim 11, said second and third amplifier means each including an output terminal, and further including a second control circuit connected to control the output of said first amplifier means, said second control circuit including an input circuit connected across said output terminals.

16. In a control system as set forth in claim 11, said second and third amplifier means each including an output terminal, and further including a control winding on said first amplifier means connected across said output terminals for controlling the output of said first amplifier means.

17. In a control system as set forth in claim 16, said first control circuit including a control winding on said second amplifier means and a control winding on said third amplifier means connected in series circuit with said control winding on said second amplifier means.

18. In a control system as set forth in claim 11, further including a damping circuit connected to receive the output of said second and third amplifier means for preventing said motor from overshooting in response to a control signal which suddenly changes its amplitude or polarity.

19. In a control system as set forth in claim 11, said second and third amplifier means each including an output terminal, and a third control circuit for controlling the output of said second and third amplifier means connected on the one hand to said output terminals and on the other hand to said second and third amplifier means, said third control circuit including means for introducing a time delay in the signal fed back from said output terminals to said second and third amplifier means.

20. In a control system as set forth in claim 11, said second and third amplifier means each including an output terminal, a second control winding on said second amplifier means, a second control winding on said third amplifier means connected in series with said second control winding on said second amplifier means, and a negative feedback circuit connected between said output terminals and said pair of second control windings, said feedback circuit including a time delay circuit for substantially delaying the signal fed back from said output terminals to said pair of second control windings.

21. In a control system for a direct current motor having a field winding and armature, in combination, first magnetic amplifier means including rectifier means as the output stage thereof connected to deliver current in one sense only to said armature; second and third magnetic amplifier means of the direct current output type, one connected intermittently to pass current through said field winding in one sense and the other connected intermittently to pass current through said field winding in the opposite sense, whereby, when the outputs of said second and third amplifier means are of equal amplitude, there is no rotation of said armature; connection means for a source of direct current control signal having a sense indicative of the direction of motor rotation desired; first control circuit means coupled to said second and third amplifier means, and responsive to said direct current control signal, for increasing the output of said third amplifier means and decreasing the output of said second amplifier means in response to a control signal of one sense, and decreasing the output of said third amplifier means and increasing the output of said second amplifier means in response to a control signal of opposite sense, whereby a control signal of one sense causes motor rotation in one direction and a control signal of the opposite sense causes motor rotation in the opposite direction, and sudden changes in the polarity or amplitude of said control signal cause said motor to act as a generator and said armature to generate a voltage across its terminals which is the reverse of the voltage applied thereto by said first magnetic amplifier means; and negative feedback circuit means connected on the one hand across said armature and on the other hand to said first amplifier means, and responsive to the voltage across said armature for controlling the current output of said first amplifier means.

22. In a control system as set forth in claim 21, said feedback circuit means including a control winding on said first amplifier means for controlling the current output thereof.

23. In a control system as set forth in claim 21, further including second feedback circuit means connected on the one hand in the circuit of said armature and rectifier means and on the other hand to the circuits of said second and third amplifier means, and responsive to the current in said armature-rectifier circuit for controlling the relative amplitudes of the outputs of said second and third amplifier means.

24. In a control system as set forth in claim 23, said second feedback circuit means including a resistor in series circuit with said armature and said rectifier means, a control winding on said second amplifier means, and a control winding on said third amplifier means in series circuit with said control winding on said second amplifier means.

25. In a control system for a direct current motor having a field winding and armature, in combination, first magnetic amplifier means including rectifier means as the output stage thereof connected to deliver current in one sense only to said armature; second and third magnetic amplifier means of the direct current output type, one connected intermittently to pass current through said field winding in one sense and the other connected intermittently to pass current through said field winding in the opposite sense, whereby, when the outputs of said second and third amplifier means are of equal amplitude, there is no rotation of said armature; connection means for a source of direct current control signal having a sense indicative of the direction of motor rotation desired; first control circuit means, including second rectifier means in circuit therewith for rectifying the current passing therethrough, coupled to said first amplifier means and connected to receive said direct current control signal, for changing the voltage output of said first control circuit means in accordance with the amplitude of said direct current control signal, whereby the greater the amplitude of said control signal, whether positive or negative, the greater the voltage applied by said first amplifier means to said armature and vice-versa; second control circuit means coupled to said second and third amplifier means, and responsive to said direct current control signal, for increasing the output of said third amplifier means and decreasing the output of said second amplifier means in response to a control signal of one sense, and decreasing the output of said third amplifier means and increasing the output of said second amplifier means in response to a control signal of opposite sense, whereby a control signal of one sense causes motor rotation in one direction and a control signal of the opposite sense causes motor rotation in the opposite direction, and sudden changes in the polarity or amplitude of said control signal cause said motor to act as a generator and said armature to generate a voltage across its terminals which is the reverse of the voltage applied thereto by said first magnetic amplifier means; and negative feedback circuit means connected on the one hand across said armature and on the other hand to said first amplifier means, and responsive to the voltage across said armature for controlling the current output of said first amplifier means.

26. In a control system as set forth in claim 25, said first control circuit including a control winding on said first amplifier means, and said second control circuit including a control winding on said second amplifier means connected in series with a control winding on said third amplifier means.

27. In a control system as set forth in claim 25, further including a resistor and differential circuit means connected between said negative feedback circuit and said first control circuit, and responsive to a negative feedback current of a given amplitude with respect to the current in said first control circuit for placing said resistor across said armature to provide a braking torque to the rotation of said armature.

28. In a motor control system as set forth in claim 27, said differential circuit means including a differential relay having a pair of coils, one of said coils being in series circuit with said negative feedback circuit and the other of said coils being in series circuit with said first control circuit.

29. In a control system as set forth in claim 25, further including second feedback circuit means connected on the one hand to the circuit of said armature and first-named rectifier means and on the other hand to the circuits of said second and third amplifier means, and responsive to the current in said armature-rectifier circuit for controlling the relative amplitudes of the outputs of said second and third amplifier means.

30. In a control system as set forth in claim 25, said direct current control signal being adjustable over a predetermined range, and further including bias means operatively associated with said first magnetic amplifier means for deactivating said first amplifier means for control signals having an amplitude smaller than a relatively small fraction of a control signal of maximum amplitude, and bias means operatively associated with said second and third magnetic amplifier means for permitting one of the latter amplifier means to be driven to saturation and the other to be cut off in response to control signals having an amplitude equal to or greater than said relatively small fraction of said control signal of maximum amplitude, whereby the speed regulating effect of said motor control system starts with substantially full field strength.

References Cited in the file of this patent

UNITED STATES PATENTS 2,414,936     Edwards et al.   ----------- Jan. 28, 1947